Dec. 28, 1965  R. P. HOLLAND, JR  3,226,031
INDUCTION PROPELLER

Filed Oct. 31, 1962  6 Sheets-Sheet 1

Raymond Prunty Holland, Jr.

Raymond Prunty Holland, Jr.

Raymond Prunty Holland, Jr.

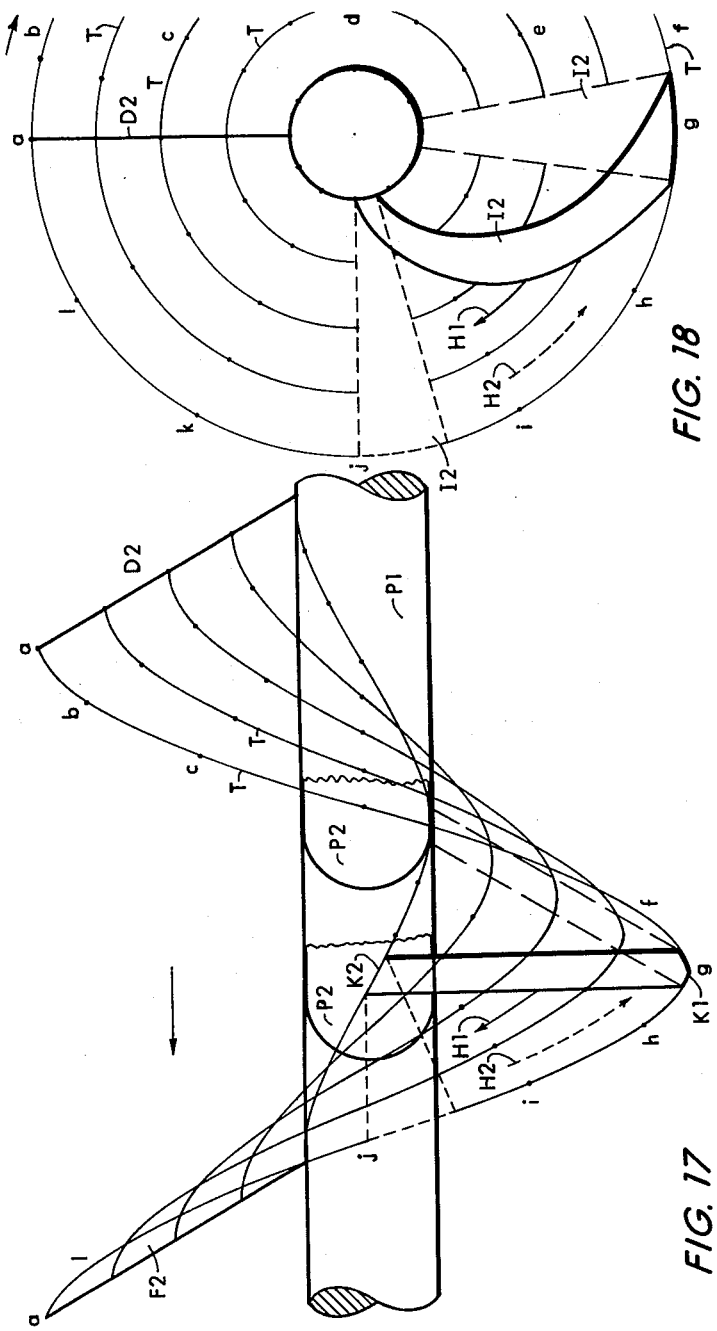

Dec. 28, 1965    R. P. HOLLAND, JR    3,226,031
INDUCTION PROPELLER
Filed Oct. 31, 1962    6 Sheets-Sheet 6

Raymond Prunty Holland, Jr.

United States Patent Office 3,226,031
Patented Dec. 28, 1965

3,226,031
INDUCTION PROPELLER
Raymond Prunty Holland, Jr., 1702 W. 3rd St.,
Roswell, N. Mex.
Filed Oct. 31, 1962, Ser. No. 234,508
10 Claims. (Cl. 170—159)

This application is a continuation-in-part of application Serial Number 683,774 filed September 13, 1957, now abandoned.

This invention relates to propellers for watercraft and aircraft, and relates in particular to an induction type of screw propeller which produces relatively large values of thrust per unit of propeller frontal disk area and per unit of power input to the propeller.

It is a primary object of this invention to produce a propeller capable of absorbing relatively large amounts of power in a small diameter and of yielding relatively large values of thrust per unit of power absorbed. It is a further primary object to accomplish these results in a propeller having an external form which permits its use interchangeably with existing propellers.

Other objects of the invention include the following:

To produce a propeller (a) which can be installed in a smaller space, weighs less and costs less than a conventional propeller of equal performance, (b) which produces the characteristic performance of a large diameter propeller at slow forward speeds, and the characteristic performance of a small diameter propeller at fast forward speeds, each characteristic where it is the most beneficial, (c) which reduces the amount of pitch change required to achieve optimum propeller performance, thereby eliminating the need for pitch-changing mechanisms for propellers in many uses, and which thereby achieves appreciable relative advantages equivalent to pitch change in all fixed pitch propellers, (d) which may be put to practical use as a cavitating marine propeller, having general cavitation over the backs (upstream faces) of its blades at a relatively high cavitation number, corresponding to relatively slow forward speed, as compared to existing propellers, in that way finding practical applications on watercraft at speeds which are too fast for high-thrust non-cavitating propellers but which are not as fast as required by existing super-cavitating propellers, the latter speeds being so fast as to be unattainable for most practical purposes at the present state of the art, (e) which, in a small diameter design turning at high speed, may be applied to a fast-turning turbine engine on an aircraft, reducing cost, weight, and complexity in the propeller-engine-aircraft combination, without large losses of static thrust or propulsive efficiency, thereby making possible a high-speed turboprop aircraft capable of short take-off runs and having an improved competitive position relative to aircraft using pure jet and by-pass jet power plants, (f) which, in a fixed pitch design of inexpensive construction, may be applied to the inexpensive class of light airplanes, giving these airplanes improve performance in take-off, climb, and high speed, as compared to that attainable with a conventional propeller, (g) which, in a design to produce maximum static thrust, will permit vertically rising aircraft of a given power and propeller diameter to lift substantially increased gross weights off the ground, without sacrificing acceptable high speed performance, (h) which will increase the cruising power economy of large ocean-going ships and similar vessels, (i) which will increase the cruising power economy of barge tugs, (j) which will increase the thrust and the accelerative ability under load of harbor tugs, (k) which will produce much higher thrust at slow speeds for sports motor boats, for example to pull water skiers from the submerged to the planing condition, without requiring more engine power and without reducing the boat's high speed, and (l) which will increase the speed, fuel economy and versatility of motor boats, including popular outboard motor boats.

Still further objects are to reduce the velocity of the final slipstream from the screw propeller without reducing the thrust of the propeller, thereby achieving the above objects and also reducing the drag of any objects lying in the slipstream; reducing the noise produced by the propeller race of submarines seeking to avoid detection; reducing the wind blast beneath vertically rising propeller aircraft, behind conventional aircraft and behind ground vehicles employing propellers; and permitting the propellers to operate with reduced dust blowing, rock throwing and other similarly objectionable slipstream effects too numerous and well known to warrant listing here.

An induction propeller is a screw propeller having a blade form derived from a generated helical surface having pronounced forward rake of its radial generatrix.

An understanding of the concept of the induction propeller requires a physical description of the action of the propeller and a full definition of its geometrical characteristics, which follow below.

The physical action of the induction propeller is concerned basically with its ability to produce a relatively expanding slipstream which thereby moves more slowly than does the contracting slipstream from a conventional propeller, in this way reducing the amount of kinetic energy which is lost in the slipstream. Coupled with this characteristic the induction propeller generates relatively faster flow through its propeller disk, enabling it to accomplish a large mass flow rate despite its small diameter.

Any propeller achieves forward thrust by accelerating fluid mass rearwardly. This is seen in its simplest form, in the static case, when the propeller does not advance relative to the remote air. The "static thrust" which is developed under these circumstances is, Static Thrust = (mass flow per unit time)
(slipstream velocity)          (1)

and the power which is wasted in the slipstream,

Slipstream Power =

$$\frac{(\text{mass flow per unit time})}{2} (\text{slipstream velocity})^2 \quad (2)$$

and, $$\frac{\text{Static Thrust}}{\text{Slipstream Power}} = \frac{2}{\text{slipstream velocity}} \quad (3)$$

Therefore, to increase the ratio of Static Thrust/Power of any propeller it is necessary to keep the slipstream velocity small, but this alone would decrease thrust. To hold thrust constant the product of (mass flow per unit time)(slipstream velocity)

must be kept constant. Or in other words it is necessary to increase the rate at which mass passes through the propeller, without increasing the final slipstream velocity.

With a conventional propeller, it is well established by theory and confirming tests that the final slipstream velocity is twice the velocity through the propeller disk, in the static case. Consistently, the cross sectional area of the final slipstream constricts to one-half the cross sectional area of the stream through the propeller disk. This inflexible situation prevents any increase of the mass flow rate through a conventional propeller, at constant slipstream velocity, except by the use of a larger propeller.

To obtain higher thrust per unit power without using a larger propeller it is necessary, somehow, to prevent the contraction of, or to expand, the stream passing rearwardly from the propeller, so that the final slipstream velocity and energy loss are relatively small, and the mass flow rate in the stream and the thrust are relatively large.

The induction propeller accomplishes this result by the obvious but over-looked method of driving fluid radially outward from the axis of the propeller as it passes through the propeller disk. This action is achieved, not by any particular form or position of the *outline* of the blade, but by the shape of the general helicoid surface of which the blade is a limited portion. The radial generatrix of the helix of a conventional propeller stands perpendicularly to the axis of the helix, so that any pressure difference acting across the surface generated by this "normal" generatrix must act parallel to the axis of rotation, without any component of force cross-wise to the axis. On the induction propeller, on the other hand, the radial generatrix is raked forward at the tip. Now when the surface generated by this generatrix experiences a pressure a radial component of force exists, acting cross-wise to the axis of rotation.

The predominant features of the actions of propellers are described most readily by a simple momentum theory which defines the ideal performance assuming a frictionless incompressible fluid and replaces the detailed actions of the blades by an "actuator disk" through which the propulsive stream flows without resistance and which has the assumed property, for purposes of analysis, of maintaining a higher pressure on its downstream face than on its upstream face. In the case of the conventional propeller the actuator disk is a flat surface, that surface which is generated by rotating the upright radial generatrix of the helix once around the axis without forward advance. In the case of the induction propeller the actuator surface is no longer flat. Now a forwardly sloping line is rotated once around the axis. A straight line generatrix so rotated generates a cone with its hollow side upstream.

The action of the induction propeller actuator surface flat plane or cone, accelerates each particle of fluid perpendicularly to the local spot on the actuator surface through which it passes. The conventional flat actuator drives each particle downstream and the cone-shaped induction actuator drives each particle angling away from the axis as it moves downstream.

The action of the induction propeller actuator surface may be considered as the resultant of two component actions, a downstream component acting like a conventional actuator, and a component at each infinitesimal of actuator surface acting radially outward perpendicular to the propeller axis. To visualize the outward action, one may assume an array of infinitesimal frictionless ring-shaped wing-like surfaces, each ring concentric with the propeller axis, distributed uniformly over the surface of the conventional flat actuator. When flow exists rearwardly, each airfoil section of each of these rings guides flow somewhat outwardly away from the propeller axis. This requires flow to move outwardly downstream; this is possible only if as much fluid also moves toward the axis upstream. Over a given period of time the volume flow inwardly upstream must equal the volume flow outwardly downstream, and this same volume of flow must pass rearwardly through the actuator disk in addition to the flow there due to the axial component of the actuator, which requires an increased velocity through that actuator.

Each airfoil section behaves as an airfoil in a ring-shaped wing of infinite span (having no free tip) with the low pressure surface of the wing toward the axis, and with "lift" being produced toward the axis. Such airfoils would experience lifting circulation, but there would be no net downwash. The "upflow" due to lifting circulation would produce inflow toward the axis (in the flow, approaching the propeller), and the "downflow" off the wing trailing edge (downstream) due to lifting circulation would produce outflow away from the axis (which would clearly be equal) and the high velocity flow "above" the wing would be the high velocity through the actuator, through a venturi-like passage formed by each pair of airfoils on opposite sides of the axis with their low pressure surfaces facing each other.

One may think of the disk of the induction propeller as consisting of an array of ring vortices, each ring being concentric with the axis of the propeller and lying in the plane of the actuator disk, each having the vorticity corresponding to lifting circulation, and each producing velocity contributions as follows: downstream on the side toward the propeller axis, outward away from the axis on the downstream side, upstream on the side away from the axis, and toward the axis upstream. This vortex motion combined vectorially with a general rearward flow produces the basic flow pattern of the induction propeller.

From this conceptual aerodynamic picture of the flow induced by the induction propeller several significant conclusions are implied: The radially outward acceleration of fluid by the induction propeller consumes no energy. The vortex pattern which is superimposed on the flow of the conventional propeller consists wholly of closed paths which remain continuously associated with the propeller in steady flow conditions; there is no residual velocity anywhere which is lost from the system. The action functions only to modify the streamline pattern through the propeller, in a manner which meets our purposes.

These concepts make possible a simple mathematical analysis, patterned after classical momentum theory. Using a cone-shaped actuator surface across which the pressure difference is assumed constant at all points, the following relationships were obtained:

$$\frac{V_s}{V_p} = -4 \tan \theta + (16 \tan^2 \theta + 4)^{1/2} \text{ (for the static thrust case)} \quad (4)$$

and, $$\frac{\text{Thrust per unit power, conventional}}{\text{Thrust per unit power, induction}} = [(4 \tan^2 \theta + 1)^{1/2} - 2 \tan \theta]^{1/3} \quad (5)$$

where $V_s$ is the final slipstream velocity downstream, $V_p$ is the velocity through the propeller disk, and $\theta$ is the angle of forward rake of a straight generatrix.

These results indicate that a forward rake of a generatrix of 30° will produce a 39 percent increase in the static thrust at constant power, and that a forward rake of 20.5° causes the final slipstream to have the same diameter as the propeller, and thereby produces as much static thrust benefit as obtained by enclosing a conventional propeller in a straight cylindrical thin-sectioned duct close around the propeller tips, in the form commonly called a "ducted-fan," (without the disadvantages of weight, drag, cost and encumberance of the ducted fan).

Effects similar to those described above for the case of static thrust also apply when the speed of advance of the propeller through the fluid is relatively slow. The induced flow fields become progressively less prominent and the induction propeller acts progressively more like a conventional propeller as forward speed increases.

As this process occurs, the induction propeller requires relatively less change of blade pitch angle for optimum performance, because the change of speed of the flow through the propeller disk in changing from zero forward speed to top speed is smaller for an induction propeller than for a conventional propeller, by the amount of the rearward flow velocity induced at the induction propeller at the condition of zero advance. Furthermore, the induction propeller gains the benefit of a relatively outward sloping flow across the propeller blades at low speeds, which, because of the twist of the blade, cause a relatively low true pitch angle to exist along the line of flow. The conventional propeller, on the other hand, experiences a relatively inward flow, which increases its true pitch, to the relative detriment of its low speed thrust.

An induction propeller mounted on the nose of an aircraft or in front of a nacelle gains thrust at slow forward speeds due to the action of low static pressure acting on the forwardly exposed surfaces of the propeller hub, cowling, and similar parts. For as the flow necks down in passing through the propeller disk, generating high speeds there, the static pressure in the flow reduces correspondingly, as required by Bernoulli's principle. With marine propellers this effect may be used to advantage in a special application to promote general cavitation over the upstream face (the low pressure face) of the propeller blade. With conventional propellers cavitation ordinarily occurs at fast forward speeds, and propellers designed to operate with super-cavitating blade sections require high forward speeds to enable the blades to enter their design regime. This speed is typically too fast to be of much practical value at the present time. The characteristically low static pressure which occurs at the induction propeller enables the cavitation effects of high speeds to occur at relatively slower true advance speeds, so that the super-cavitating regime is more readily attained. This action has been confirmed by tests.

Heretofore the benefits of the induction propeller have been thought to be unattainable for basic physical reasons. For each openly exposed screw propeller of a given diameter, operating under a given set of conditions, an "ideal efficiency" and a certain maximum ideal thrust were believed to exist which could not be increased *by any conceivable propeller improvement*. This viewpoint resulted from unquestioning adherence to the ideas of propeller performance derived from the concept of the flat plane actuator disk, or its equivalent, the normal generatrix. This concept is now readily expanded to include actuator surfaces derived from generatrices of any shape. Consequently, the ideal induction propeller can now exceed the efficiency and thrust of the ideal conventional propeller, when these characteristics are based (according to convention) on the diameter of the propeller. Thereby a channel of development which has been closed for nearly a century is now opened by this invention.

To understand the form of the induction propeller and the significance of this form it is essential that the general form of the screw propeller and the differences of form found in the induction propeller be carefully considered. The geometric elements defined below are indicated on the drawings by the same designations used below. See especially FIGURES 4 through 8.

A. Axis of rotation: The central fore-and-aft line through the propeller which maintains a constant position when the propeller rotates.

B. Radial plane through propeller: An imaginary flat plane passing through the axis of rotation.

C. Radial generatrix: An imaginary line lying in a radial plane which generates the form of the propeller blade by motion forward and in rotation around A.

C1. Root end of generatrix: The end of the radial generatrix closest to the axis of rotaton. The root end may rest on that axis when a hub is not present but is considered to approach no closer than the generating hub when a hub is present.

C2. Tip end of generatrix: The end of the radial generatrix farthest from the axis of rotation. In generating the helix the tip end of the generatrix passes through all points at which the extreme tip end of the propeller blade might possibly be located.

D1. Normal generatrix: A radial generatrix such that a straight line connecting its tip end and its root end stands perpendicular to the axis of rotation as on conventional propellers.

D2. Forwardly raked generatrix: A radial generatrix the tip end of which lies forward of its root end.

D3. Rearwardly raked generatrix: A radial generatrix the tip end of which lies rearward of its root end.

D4. Forward rake of radial generatrix: The distance that the tip end of the generatrix lies forward of the root end of the generatrix.

E1. Forward convexity of generatrix: A generatrix which coincides with a straight line connecting its end points C1 and C2 has no convexity. A portion of a generatrix lying forward of this line has forward convexity.

E2. Rearward convexity: The reverse of E1. Any portion of the generatrix lying rearward of a straight line connecting its end points has rearward convexity.

F. Generated helical surface: The surface traced by a radial generatrix in moving in rotation at constant angular velocity around the axis of rotation and simultaneously translating forward at constant linear velocity, such that each point on the generatrix traces a helix.

F1. Normal helical surface: A helical surface generated by a normal generatrix, as in conventional propellers. Sometimes called a normally generated helical surface.

F2. Forwardly oblique helical surface: A helical surface generated by a forwardly raked generatrix.

F3. Forward sloping obliquity: The forward slope in a radial plane at any point on a forwardly oblique helical surface, a quantity measurable in degrees from a line perpendicular to the propeller axis, in the same radial plane.

G. Helical pitch: The forward motion of the tip end of the generatrix in one revolution around the axis of rotation. When the rate of this forward translational motion with respect to rotational motion is substantially constant, the helical surface so traced has "substantially constant helical pitch." The word "pitched" denotes the existence of pitch in an appreciable amount.

H1. Side-forwardly along helix: In the same direction along the helix in which a point of the generatrix moves in generating the helical surface, having a component forwardly corresponding to the linear forward translation of the generatrix, and having a component in rotation corresponding to the simultaneous rotational displacement of the generatrix.

H2. Side-rearwardly along helix: The reverse of H1. In the opposite direction. Rearwardly in translation and in rotation along the generated helical surface.

I. Helical blade surface form: A portion of a generated helical surface selected at will as a reference surface for the definition of a blade form, that portion lying within a selected blade outline lying on the generated helical surface. A blade which is "helically pitched" is a blade conforming to a helical blade surface form and having a substantial amount of pitch G.

I1. Normal helical blade surface form: A helical blade surface form generated by a normal generatrix.

I2. Forwardly oblique helical blade surface form: A helical blade surface form generated by a forwardly raked generatrix.

J1. Blade leading edge: The front edge of the blade.

J2. Blade trailing edge: The rear edge of the blade.

K1. Blade tip end: The end of the blade farthest from the axis of rotation.

K2. Blade root end: The end of the blade closest to the axis of rotation, lying on the generating hub if a hub is present, and otherwise lying on the axis of rotation.

L1. Outer region of blade: The portion of the blade area not adjacent to the root end of the blade.

L2. Inner region of blade: The portion of the blade area adjacent to the root end of the blade.

L3. Tip region of blade: The portion of the blade area adjacent to its tip end.

M. Blade design airfoil section: A cross-section of the propeller blade having all points at constant radius from the axis of rotation, and having all points on or near the helical blade surface form I.

M1. Middle reference point of blade airfoil section: A point midway between the leading point and the trailing point of the blade design airfoil section.

N. Centerline length of blade: The length from the root of the blade to the tip of the blade along a line joining the middle reference points of the blade design airfoil sections.

O1. Forward rake of blade: The distance that the middle reference point of the tipmost design airfoil section of the blade stands forward of the middle reference point of the blade root design airfoil section.

O2. Rearward rake of blade: The reverse of O1. The distance that the middle reference point of the tipmost design airfoil section stands rearward of the middle reference point of the blade root airfoil section.

P. Hub: A central member located more or less symmetrically around the axis of rotation to which the blades are attached. The hub is distinguished from the blade by the characteristic that the hub member includes means for attachment to a drive shaft whereas a blade does not, and further that the blade conforms generally to the generated helical surface while the hub does not necessarily conform to that surface.

P1. Generating hub: An imaginary cylindrical surface of unlimited fore-and-aft length, all cross sections of which are circles of equal size centered on the axis of rotation, this cylindrical surface having the smallest cross-sectional size which completely encircles the hub. (When hubs of a wide variety of forms are present on various propellers the idea of the generating hub permits comparisons on a uniform basis.)

P2. Aerodynamic hub: A hub having the form of an axisymmetrical body of revolution centered on the axis of rotation.

Q. Induction propeller: A screw propeller having a blade form derived from a generated helical surface having pronounced forward rake of its radial generatrix (but not necessarily having forward rake of its blades).

Q1, Q2, etc.: Particular examples of induction propellers.

R. Sweptback induction propeller blade: An induction propeller blade on which successive middle reference points of the design airfoil sections in progressing from blade root toward blade tip lie at progressively side-rearward positions of the generatrix. An induction propeller blade without forward rake is always sweptback.

Sweptback propeller blade, in general, including non-induction propellers: A propeller blade on which the middle reference point of the blade root design airfoil section lies at an angle ahead (in the direction of rotation) of the middle reference point of the blade tip design airfoil section, as viewed along the axis of rotation, said angle being measured relative to the axis of rotation. This defines the overall sweep of the blade. Local segments of the blade lying between two airfoil sections are sweptback (or sweptforward) according to the relative angular positions of the bounding airfoil sections at the inner and outer boundaries of the segment in question.

R1, R2, etc.: Particular examples of sweptback blades.

S. Space or volume swept out in one rotation without axial translation: The space which is occupied by a part of the propeller, or through which a part of the propeller passes, as it turns through one rotation on its axis and does not move otherwise. On a propeller having blades raked sharply forward, a hollow space may exist within the circle traced by the blade tips, in the region forward of the roots of the blades and forward of the hub; this space is not part of the space swept out in rotation because it is not occupied by a part of the propeller and no part of the propeller passes through it.

T. Helical trace line: A line traced along a generated helical surface by a point on the radial generatrix.

In the drawings, FIGURE 1 is a side view diagram of the essential action of a conventional propeller, in the static thrust condition, rotating about its axis and having no translational motion, showing normal generatrix D1 and streamlines 1. FIGURE 2 represents an induction propeller in the same condition, indicating the forwardly raked generatrix of the induction propeller, D2. The propeller blades are not shown as these may take any or numerous forms, as described below.

FIGURES 1 and 2 are taken in vertical section through the propeller axis A, and show the patterns of the fluid streamlines flowing from left to right through the regions swept by the propellers. The contraction of the streamlines downstream from the propeller in the conventional case, FIGURE 1, and the corresponding spreading of the streamlines in the induction case, FIGURE 2, are shown approximately to scale, as indicated by theory and as confirmed by test. Line 2 on these figures indicates, approximately to scale, the line along which the velocity of flow toward the propeller was barely detectable by means of a light tuft of wool on a wand during model tests, when both the conventional propeller (FIGURE 1) and the induction propeller (FIGURE 2) were at the same blade angle and were turning at the same rotational velocity. The relatively greater ability of the induction propeller to induce velocity upstream is indicated by the relatively greater distance between line 2 and generatrix D2 of FIGURE 2 than between line 2 and generatrix D1 of FIGURE 1.

FIGURE 4 is a perspective view of a conventional two-blade helical propeller typical of a marine propeller, cut by radial plane B, the intersection of which with blade form I1 is normal generatrix D1.

FIGURES 5 and 6 show side views of one half cycle each of helically generated surfaces, contrasting normal and raked generatrices. In FIGURE 5 the surface is generated by a normal radial generatrix D1 and in FIGURE 6 the surface is generated by a forwardly raked radial generatrix D2 having forward convexity.

Figure 5:
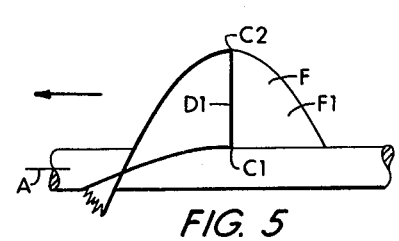
Figure 6:
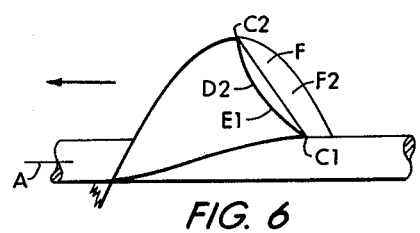

In FIGURES 4 through 7, and in all odd numbered FIGURES 9 through 29 the straight arrows indicate the forward direction. In FIGURES 5 and 6 and in odd numbered FIGURES 7 through 29 the generatrices move forward relative to a stationary background and rotate as they advance, generating helical surfaces out of which portions are selected at will to define blade forms. Starting with FIGURE 7, odd numbered figures are shown on the left; they are side views on which side views of generated helical surfaces and helical blade surface forms are shown. Even numbered figures are shown to the right of the odd numbered figures. Each of these right hand views shows an end view projection of the same helical surface and blade form shown to its left. The radial generatrix is usually shown in its "starting" and "ending" position at the top of each of the views on the right, and at the right and left ends at the top of the views on the left, indicating one complete cycle of the generated helical surface. Portions of the generated helical surfaces are sometimes omitted for clarity.

One cycle of the helix consists of translation forward a distance equal to the pitch G of the propeller and rotation 360° around the propeller axis. The rotation of the generatrix while advancing is clockwise as seen in the figures on the right and as indicated by the curved arrows in FIGURES 8, 10, 12, 14, 16, and 18.

Figures 29, 30, 31, 32:
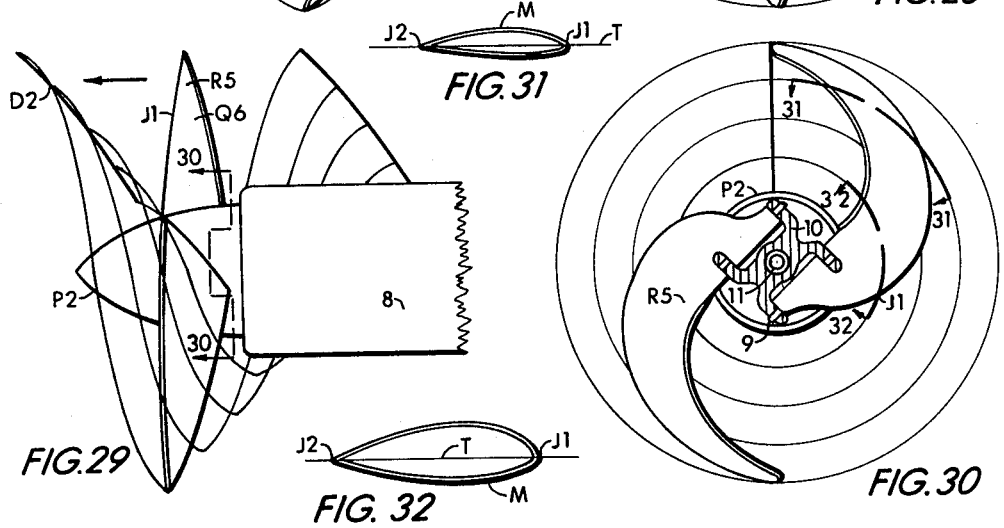

FIGURES 31 and 32 show typical cross sections of the blades of the three aircraft propellers shown in FIGURES 25 through 30.

Figure 7:
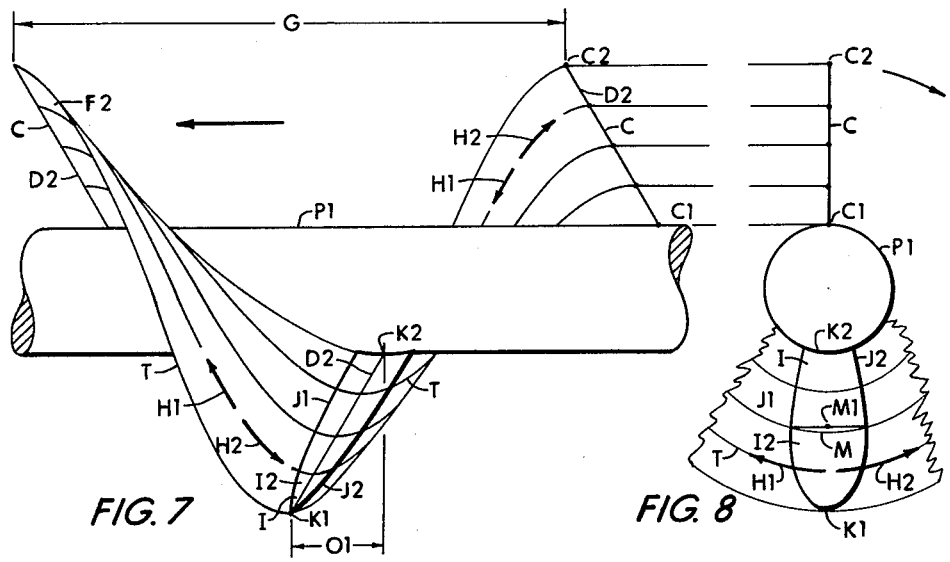
Figure 8:
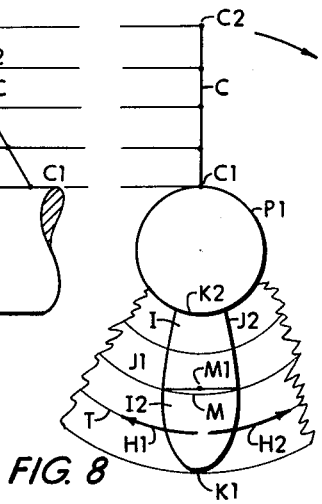

In FIGURES 7 through 30, just described, any arbitrary form drawn on the helical surface in either view, on the left or on the right, can be projected to the helical surface in the opposite view and the form is thereby determined in that view, in accordance with well known drafting techniques. In FIGURES 7 and 8 projection lines are shown connecting the views of the generatrix in the starting position. The points in the generatrix which are projected trace circles on the views on the right and trace sinusoidal curves on the views on the left, these traces jointly defining corresponding projected points on the generated helical surfaces.

On all the figures depicting propeller blades in FIGURES 7 through 30, helical trace lines T are shown, in both end views and side views, to permit projection, so that the blade forms will thereby be more fully described.

One generated helical surface corresponds to one propeller blade, and one only. On a two bladed propeller two helical surfaces are entwined, with radial generatrices opposite each other as seen in side view and 180° apart in end view, and on a three bladed propeller three identical helical surfaces are spaced 120° apart, and so on for any number of blades.

FIGURES 9 through 16 are diagrams which distinguish between the geometry of a blade form I2 generated on a *forwardly oblique* helical surface, and a blade form I1 generated on a *normal* helical surface. The understanding of the difference between these two forms of blade is vital to an understanding of the induction propeller, and to convey this understanding it is necessary to make careful distinction between the superficial appearance due to the blade outline and the fundamental form which depends ultimately on the rake of the generatrix which forms the helical surface from which the blade form is derived.

FIGURES 9 and 10 and FIGURES 13 and 14 illustrate forwardly oblique helices F2 on which *forwardly oblique* blade surface forms I2 appear. On the other hand FIGURES 11 and 12 and FIGURES 15 and 16 illustrate normal helical surfaces on which *normal* blade surface forms I1 are shown.

For purposes of facilitating comparison, as many features as possible on these figures have been made identical: pitch G, the outside diameter of the helix, the diameters of corresponding helical trace lines T as seen in the right hand views, the diameter of the generating hub P1, the blade width at corresponding distance from the axis, the location of the blade tip at the bottom of each figure, and the use of a straight blade leading edge in one view or the other in all examples.

Figures 9, 10:
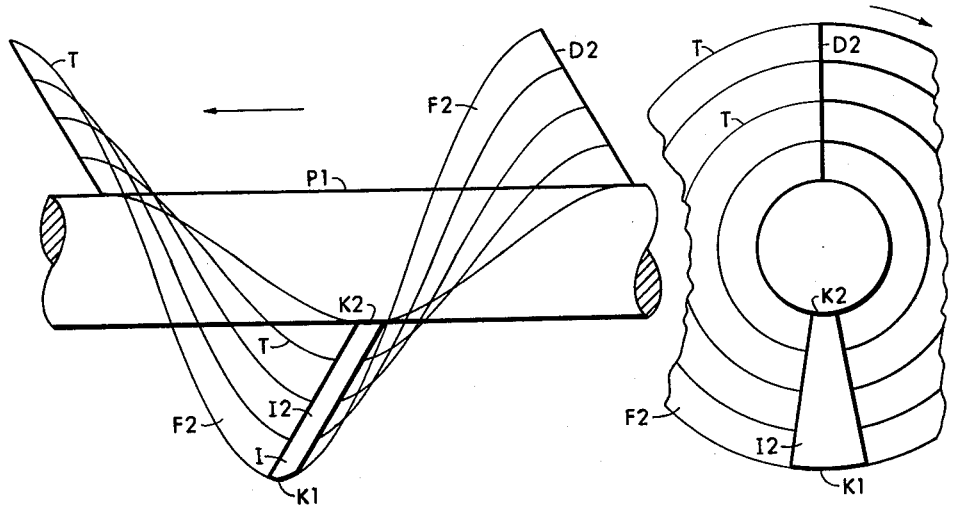
Figures 13, 14:
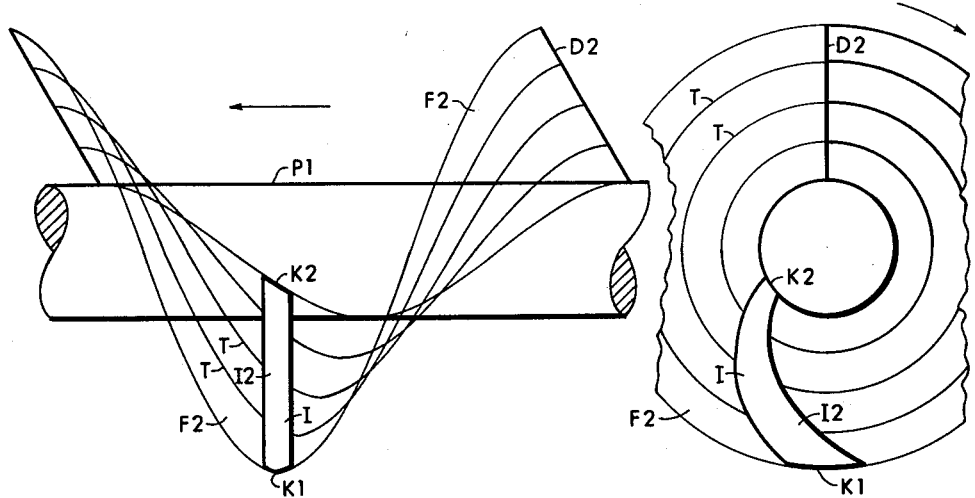

On FIGURES 9 and 10 and on FIGURES 13 and 14 the blade surface form I2 is *forwardly oblique*, despite the superficial appearance of FIGURE 13.

Figures 11, 12:
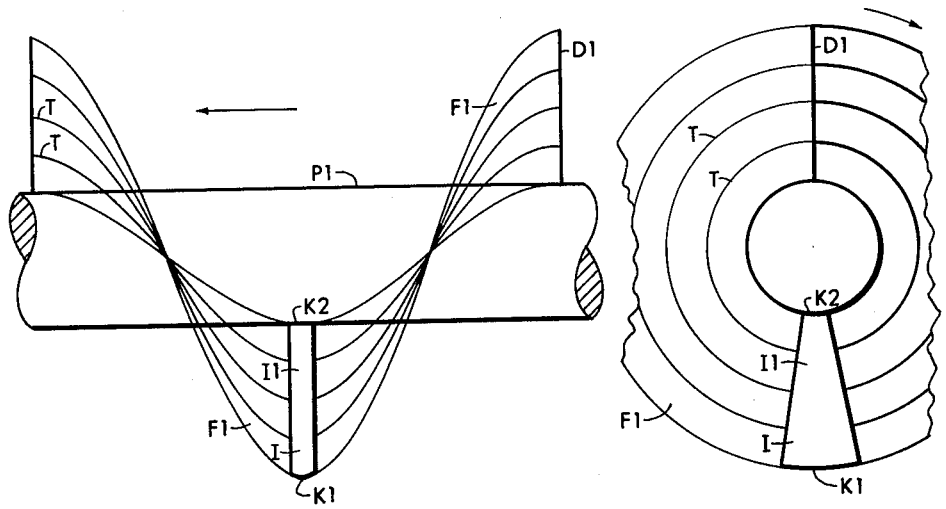
Figures 15, 16:
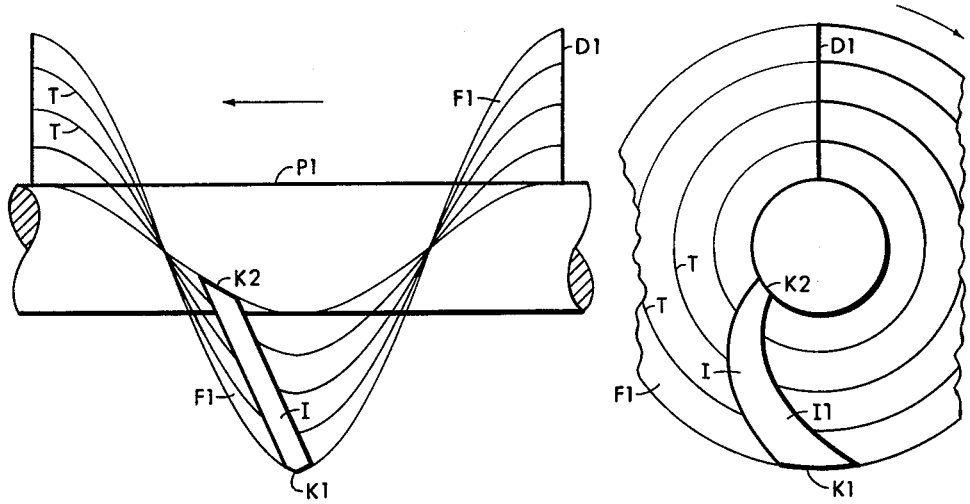

On FIGURES 11 and 12 and on FIGURES 15 and 16 the blade surface form is *normal*, as on conventional propellers, despite the superficial appearance of FIGURES 15 and 16.

The shape of the helix, *not* the shape of the blade outline, determines blade obliquity.

When both the induction propeller and the normal conventional propeller have blades which are straight in the axial view, as shown respectively in FIGURES 10 and 12, the induction propeller blade I2 is raked forwardly, in contrast to which the normal conventional blade I1 has no rake.

When the induction propeller blade is so derived from its forwardly oblique generating helix that its side view is straight and stands normal to its axis of rotation, so that the blade form has no forward rake, as shown in FIGURE 13, the end-view form of the blade is curved and swept back, as shown in FIGURE 14.

FIGURE 11 may be compared with FIGURE 13; side views are nearly alike, even though FIGURE 11 shows a *normal* conventional blade form I1 whereas FIGURE 13 (despite its superficial appearance) shows a *forwardly oblique* induction blade form I2. The differences become apparent in the front views; in FIGURE 12 the normal conventional blade form I1 is seen to be straight and radial, whereas FIGURE 14 shows that the forwardly oblique induction blade form I2 is curved and sweptback; its tip lies relatively rearward of its root in rotation. These shapes can be readily confirmed by projecting points between the right hand and the left hand views.

It is to be emphasized that the generating helix determines the blade form type, and that the blade form type cannot be identified by the superficial appearance of either the side view or the end view taken along, but it can be determined by considering end view and side view taken together.

When a conventional normal propeller blade I1 is so derived from its generating helix that it has a front view form superficially resembling a sweptback induction propeller blade, it can no longer stand normal to its axis of rotation in side view. See FIGURES 15 and 16.

If a conventional propeller is to be sweptback in front view (like FIGURE 16) it must be raked rearwardly in side view (like FIGURE 15). And if an induction propeller has no rake in side view, as in FIGURE 13, it must be swept back in end view, as in FIGURE 14.

Any propeller blade which combines front and side views like FIGURES 13 and 14 or like FIGURES 9 and 10 is a forwardly oblique induction propeller blade, but any propeller blade which combines front and side views like FIGURES 11 and 12 or like FIGURES 15 and 16 is not an induction propeller blade.

It will be apparent to a person skilled in descriptive geometry how the obliquity of the generating helix of any screw propeller may be determined, given only the side view and the end view of the propeller, and from this information it will be known whether the propeller is an induction propeller or whether it is not.

Sweptback propellers somewhat resembling FIGURES 14 and 16 are not new to either aircraft or watercraft. Yet these forms have been accomplished, not by a forwardly oblique helical surface as in FIGURE 13, but by rearward raking of the blade tips as in FIGURE 15. Usually such propellers combine a forward sweep near the blade root with a rearward sweep near the blade tip, as seen in the end view. This shape produces a side view which starts out from the root as if forwardly raked, and then bends rearward toward the tip, producing a moderate amount of overall rearward rake. It should be apparent from the above discussion that such propellers are not induction propellers.

FIGURES 17 and 18 are diagrams which show that the forwardly tilted induction propeller blade (like FIGURES 9 and 10) and the sweptback induction propeller blade (like FIGURES 13 and 14) are two superficial forms of the same basic geometry, that there are many other forms equivalent to these two, that the form of the generated helical surface is basic to the induction propeller, and that the form of the blade outline is a comparatively superficial matter. In these figures forwardly oblique radial generatrix D2 starts at position *a* and proceeds successively to positions *b*, *c*, *d*, and so on tracing helical trace lines T. In one cycle of the helix the displacement of the generatrix is forward in translation from position *a* to position *a'* as seen in FIGURE 17, and sideward in rotation from position *a* through positions *k* and *l* back to the vertical position, as seen in FIGURE 18. The combined motion of any point of the generatrix is side-forwardly along forwardly oblique helical surface I2, as indicated by the solid line arrows H1 in FIGURES 17 and 18. The dash line arrows H2 in these figures indicate the opposite direction, the side-rearward direction.

On the single helical surface of FIGURES 17 and 18 three different forwardly oblique helical blade surface forms 12 are shown. In solid line is a form like that on FIGURES 13 and 14; in dash line is a form like FIGURES 9 and 10; and in dotted line is a form also like FIGURES 9 and 10 but having advanced side-forwardly along the helix until its root coincides with the root of the blade shown in solid line. These three blade forms are shown attached to hub P, which is shown in a rearward position attached to the dashed line blade form and in a forward position attached to the other two blade forms.

The identity of the dotted and dashed line blade forms is evident; the former is simply a more side-forward position of the latter. The solid line blade conforms to the root position of the former and the tip position of the latter. One may consider that in deriving the solid line blade form its rootward sections are moved side-forwardly along the helix or that its tipward sections are moved side-rearwardly along the helix, relative to a forwardly raked straight blade until they lie in the same whirling plane. The tip sections would move a greater linear distance than the root section, so that the curved sweptback form of FIGURE 18 would result.

The three blade forms of FIGURES 17 and 18 are all of one basic helical form, with only the relative positions of progress of the blade airfoil sections along the helix being different in the three cases. There are clearly as many possible blade forms along this single helical surface as one would care to draw, forms intermediate to those shown, and forms more extreme including blade forms having greater forward rake than FIGURE 9 and having sweepforward when viewed normal to its whirling plane (in end view); and blades having greater sweepback than FIGURE 14 and having rearward rake.

The shape of the single helical surface which is basic to all these various geometrical forms, and not the particular portion of that helical surface which may have been selected to form a blade, is the primary source of the action of the induction propeller, because it determines the direction in which fluid is driven when the propeller whirls. No matter what the blade form outline may be, a propeller generated by a normal generatrix cannot drive fluid in a component direction outwardly from the axis of rotation, nor can a propeller generated on a forwardly raked generatrix be made which does not drive fluid that way.

The foregoing applies obviously only to pitched propellers, having a finite amount of pitch or helical advance per revolution.

FIGURES 19 through 24 show three fixed pitch induction propellers for marine use. The helical trace lines on which the lower blade of each of these propellers is based have been retained in the background to emphasize and clarify the forwardly oblique helical surface which is central and essential to the concept of the induction propeller.

Figures 19, 20:
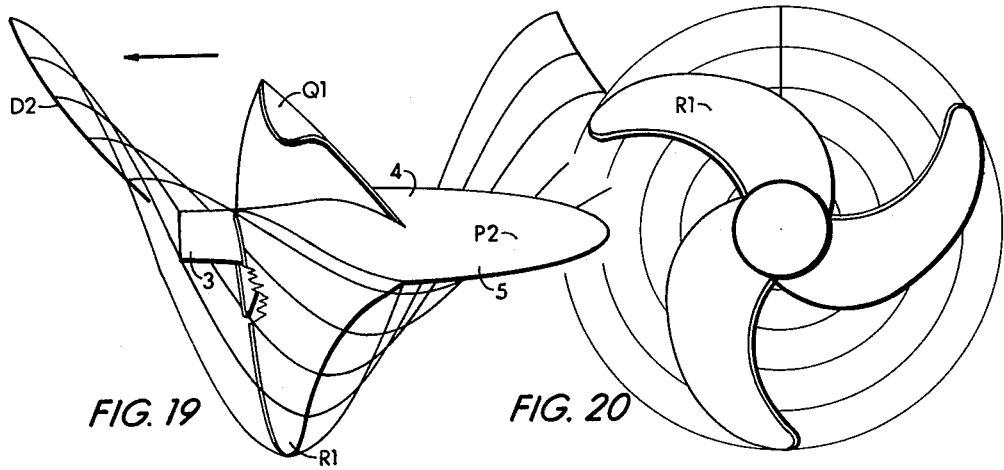

FIGURES 19 and 20 show a three bladed sweptback pusher propeller Q1 having three blades R1 attached to aerodynamic hub P2, which is a circular sectioned body of revolution producing aerodynamic benefits. The blades are attached to the hub by conventional means not shown, and the drive shaft attaches in neck 3 in front of the blades by conventional means not shown. Behind the blades is bulge 4 followed by hub afterbody 5. Bulge 4 is of larger diameter than neck 3 and the length of afterbody 5, from the trailing edge of the blades at the blade roots to the rear extremity of the aerodynamic hub, substantially exceeds the greatest front-to-rear dimension through the disk shaped volume swept out by the blades in rotation.

Aerodynamic hub P2, incorporating afterbody 5 which in turn incorporates bulge 4, produces aerodynamic benefits associated with the fact that the induction propeller induces low static pressures near its blades. It is desirable for this low pressure to act on surface area which is exposed forwardly, thereby generating a thrust force. The greater diameter at bulge 4 than at neck 3 accomplishes this result. Afterbody 5, being long, extends rearward out of the region of low pressure induced by the blades before it tapers appreciably. In this way the drag-producing action of low pressure on rearward-facing surfaces is kept to a minimum.

By generating low static pressures at its blades, the induction propeller produces a static pressure gradient, with pressures increasing rapidly in the downstream direction near the trailing edges of the blades. This effect makes induction propellers more susceptible to flow separations on the low pressure surfaces of the blades and more likely to entrain exhaust gas and bubbles and to suck them forward onto the blades, than is the case with conventional propellers. Bulge 4 on the propeller hub, with its large cross sectional diameter and its crowned contour, lowers the static pressure on the hub behind the trailing edges of the blade root airfoils, counteracting the adverse pressure there due to the induction effect of the blades. This acts to keep the flow from separating at the blade roots, and it assures rearward flow everywhere along the hub forward of the bulge, so that any bubbles entrained in the wake cannot make their way forward and consequently cannot have an adverse effect on propeller performance.

It is due only to the unique pressure-lowering property of the induction propeller that the seemingly backwards result occurs in which the enlarging of the hub behind the blades markedly increases propeller thrust and efficiency in critical flow conditions.

For the reasons just described all of the propellers in FIGURES 19 through 30 employ hubs which expand rearwardly in the region of the blades.

Figures 21, 22:
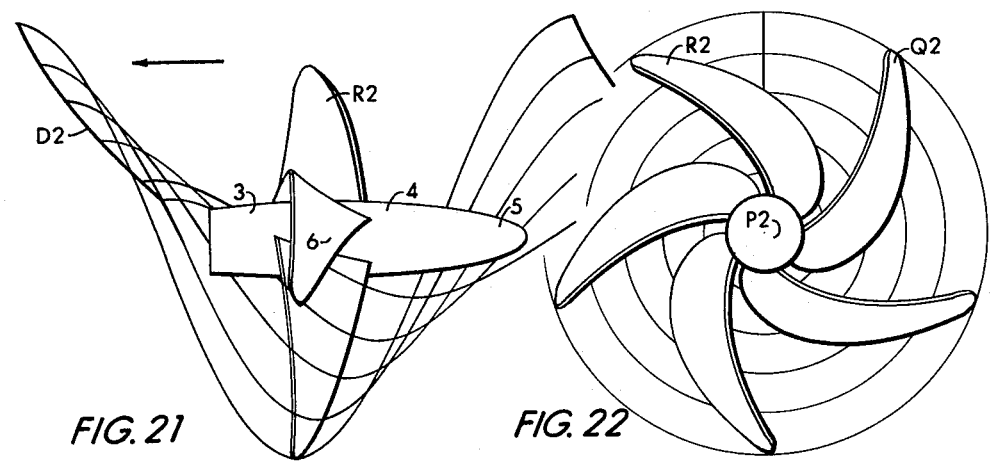

The blades on propeller Q1 in FIGURES 19 and 20 and on the five bladed propeller Q2 in FIGURES 21 and 22 are generated on a radial generatrix having forward obliquity of 45° at the root and 30° at the tip, being convex forwardly. The generatrix of the blades on the five bladed propeller Q3 in FIGURES 23 and 24 has 60° of forward obliquity throughout, which according to analysis should enable it to produce twice as much static thrust per unit power as a comparable conventional propeller. This means that a boat using this propeller would be able to pull as hard as two identical boats with conventional propellers, in a tug-of-war.

There is a limit to the extremity of form which an induction propeller may take. As forward obliquity increases a tendency increases for the expanding slipstream to disintegrate into separate disorganized vortices. The use of many slender blades is intended to counteract this tendency. Yet a point must eventually be reached, as may be visualized with a generatrix approaching 90°, at which the propeller would only force fluid radially outward, with supply streams flowing toward the propeller from the *rear* as well as from the front, and all propulsive effect would be lost. There is also a practical limit to the slenderness and length of sweptback blades which may be used. A rather extreme appearing form is more suitable than it might appear to be because the pressure of the water and the centrifugal forces on the blades oppose and tend to balance each other. However, blade flutter must eventually be encountered as speeds become faster and blades become more slender.

There are numerous practical advantages of the sharply sweptback marine propeller, the prevention of blade fouling in aquatic weeds and the reduction of the directness of any blow in a collision with a submerged object. The slant of the leading edge, even at the root sections, slices through weeds or throws them off, and each blade successively deflects any loose obstruction away from the axis of the propeller.

Marine induction propellers preferably employ the sweptback blade (FIGURES 13 and 14) rather than the forwardly raked blade (FIGURES 9 and 10), because the former permits mechanical interchangeability with existing propellers and the latter does not. Blades raked forward 60° or even 30° would strike the drive shaft housing on outboard motors and would require redesign of virtually all shafting and hulls of larger craft before they could be installed.

The propulsive and thrust advantages of the marine propellers with forwardly raked blades have been known at least since 1886 when U.S. Patent 350,278 was issued to Cotesworth P. Wetherill of Woodville, Mississippi. His propeller, however, did not come into general use, probably because it could not be directly competitive, because it was not interchangeable with existing propellers, so that it could not be installed for trial purposes by prospective users. The invention of the sweptback induction propeller which can be installed wherever a conventional propeller is now in use solves this problem, and makes the induction propeller available for a multitude of practical applications.

Figures 23, 24:
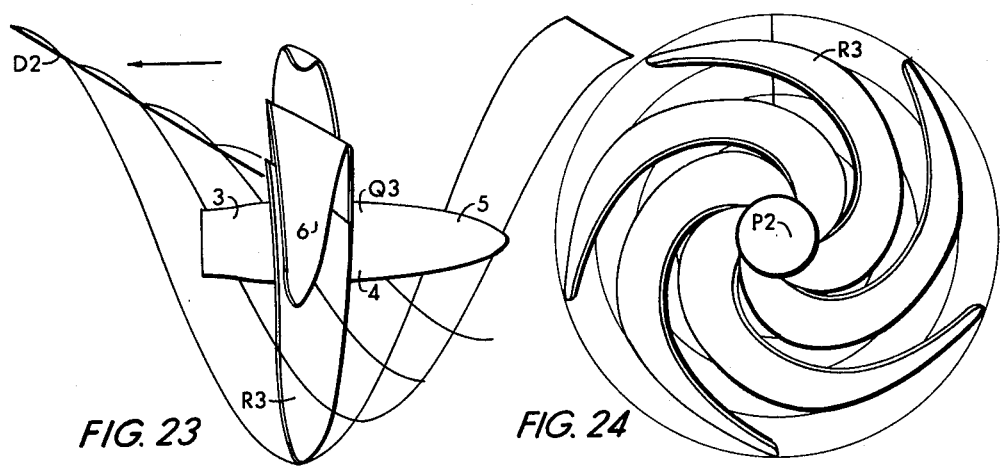

In FIGURES 19, 21, and 23 the tips of the upper blades visibly curl over causing downstream blade surface area to be visible in side view. It is inherently characteristic of all induction propellers that a side view of an induction propeller blade, along a line which proceeds perpendicularly to the propeller axis, must always show downstream blade surface area at that point. See FIGURES 21 and 23 at point 6. It is also inherently and fundamentally characteristic of all conventional propeller blades that no blade area will be seen (except possibly due to taper in thickness which will make both sides of the blade visible) at such points; the blade will be edgewise. This basic visual difference between induction and conventional propellers is true regardless of blade outline, sweep, rake, and other differences of design. The relative amount of area visible is a measure of the amount of impulse in a radially outward direction delivered to the fluid by the pressure difference across the blades. For practical purposes even an aircraft propeller turning at high speed and deflecting unavoidably under load can be qualified or disqualified as an induction propeller by direct visual observation. The rearward face of the propeller blade may be colored a highly visible color, and a photograph may be taken of the propeller whirling, from a camera located in the plane of rotation. If the color of the rearward face is generously visible in the photograph along the axis of rotation, the propeller is an induction propeller; if it is not visible there, the propeller is not an induction propeller. In this way a flexible propeller which may resemble an induction propeller when not spinning may be seen not to be an induction propeller under actual operating conditions.

Figures 25, 26:
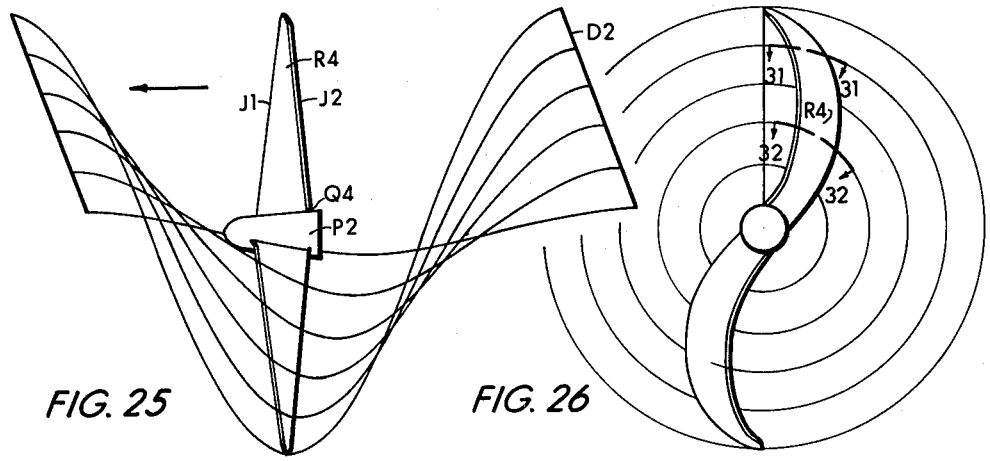
Figures 27, 28:
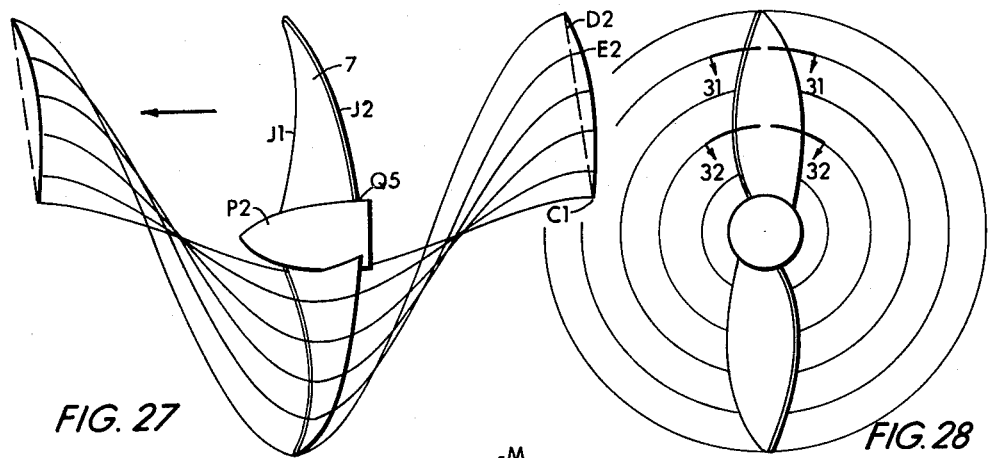

FIGURES 25 through 30 show representative examples of the application of the induction propeller to aircraft, and FIGURES 31 and 32 show sections of the hollow blades which are necessary to avoid excessive blade deflections while whirling. Propellers Q4 and Q5 in FIGURES 25 and 27 are of fixed pitch and have the same pitch as the marine propellers described above. Propeller Q6 in FIGURE 29 is a variable pitch propeller with its generating helix having pitch half as great as the other propellers, for the purpose of achieving maximum take-off thrust using a high speed turbine engine, and with its sweptback blade form designed to permit the blade tips to operate efficiently at supersonic speeds.

Propeller Q4 in FIGURES 25 and 26 is generated on a straight generatrix having 20.5° of forward obliquity, and its blades have no rake. Its blades R4 are attached by conventional means to aerodynamic hub P2. The forward obliquity of this propeller was selected for comparison with the so-called "ducted fan," having an induction action identical to the effect of a circumferential cylindrical duct around a conventional two blade propeller of the same diameter, pitch and blade area. It will develop the same static thrust per unit power as the comparable ducted fan (on which there is no flared inlet lip) and it will develop greater net thrust at high speed by virtue of its avoidance of the aerodynamic drag of the duct ring.

The aerodynamic and mechanical proportions of propeller Q4 are suitable for use on a lightplane, interchangeably with conventional propellers.

In FIGURES 27 and 28 a two bladed aircraft propeller Q5 consists of blades 7 having no sweepback, attached to aerodynamic hub P2. Blades 7 are generated on a forwardly oblique helix which is convex rearwardly, and the blades have forward rake. The generatrix of this blade form has 7° rearward obliquity at its root end, 0° obliquity at ⅔ of its blade length out from the root end, and 40° forward obliquity at its tip. The generatrix slopes rearwardly near the hub, oppositely from its predominant forward slope near its tip end. The purpose of this construction is to reduce bending moments in the inner region of the blade where aerodynamic effects are relatively small and structural effects are relatively large. For structural reasons blade 7 is relatively short and broad and the depth, width, and wall thickness of its root airfoil sections are greater than the depth, width, and wall thickness of its tip airfoil sections.

Propeller Q5 is proportioned for an aircraft which is somewhat faster and more powerful than the aircraft for which propeller Q4 is suited, and it is intended to be turned at a high rotational speed by a high speed turboshaft engine.

In FIGURE 29 and in partial sectional view in FIGURE 30 two blade variable pitch aircraft propeller Q5 is shown. It consists of strongly sweptback blades R5 pivotally attached by means of pivot pins 9, in spider 10, which is rigidly mounted inside aerodynamic hub P2. Shaft fitting 11 is rigidly attached in spider 10 for receiving the driveshaft of a turboshaft engine, not shown, installed in engine nacelle 8. Means for controlling the positions of blades R5 in rotation around pivot pins 9 are provided but are not specifically indicated herein.

Blade R5 in FIGURES 29 and 30 is generated on a generatrix sloping forwardly 30° at its root end and 45° at its tip end, being rearwardly convex, and having half as much pitch as the other propellers illustrated. The space swept out by blades R5 has the form of a substantially flat disk standing approximately perpendicular to its axis of rotation. This disk is thickened near the axis of rotation and is convex on both front and rear surfaces, being only very slightly convex on the front face, and having no front face concavity such as may be seen in the form of propeller Q5 in FIGURE 27.

The extreme tips of the sweptback propellers Q1, Q2, Q3, Q4, and Q6, trace out circles of rotation about their axes, when the propellers are rotating but are not advancing, the planes of which lie wholly within the volumes of rotation of these propellers, and which lie between their leading and trailing edges. In contrast to this the whirling plane of the tips of non-swept propeller Q5 lies generally ahead of the leading edge of this propeller.

Propeller Q6 is intended for use in a size having a small diameter on a high speed turboshaft engine installed in a high speed aircraft. Its low pitch and strong forward obliquity produce high thrust for take-off and for efficiency in slow flight as when being required to await authorization to land at an airport. Its blade form, when used at high pitch angles during high speed flight, avoids shock wave flow disturbances and thereby permits the propeller to operate at supersonic tip speeds, enabling the aircraft to operate at speeds faster than heretofore available to propeller aircraft.

The pitch-changing feature of propeller Q6 moves the blade out of the design blade generating helix whenever blade R5 is not at its low pitch design angle. The blades have their greatest forward sloping obliquity at their low-pitch take-off design point, as illustrated in FIGURE 29. As aircraft forward speed increases and pitch increases the effective forward obliquity is reduced gradually, until, when full high speed is reached the forward obliquity of the blades has been considerably reduced. This is of no practical consequence, however, since the induction effect largely disappears at high speeds even with a fixed pitch propeller, and the induction effect at low speeds is not materially changed by the amount of pitch change needed there.

In many uses the induction propeller eliminates the need for any sort of pitch changing mechanism, as in marine propellers of extreme form as shown in FIGURE 23. Yet propellers for aircraft which must develop very high thrust at low speeds and also operate at the highest speeds for which propellers are suitable cannot escape the need for a pitch-changing design.

FIGURES 31 and 32 show typical cross-sections of the blades of the three aircraft propellers shown in FIGURES 25 through 30. FIGURE 31 shows a relatively small thin-walled blade section near the tip and FIGURE 32 shows a relatively large thick-walled section near the root, at typical locations as indicated by sections 31—31 and 32—32 in FIGURES 26, 28, and 30. The sections are shown with blade leading edge J1 at the right, blade trailing edge J2 at the left, with the generally upstream face of the propeller blade at the top and the generally downstream face of the propeller blade at the bottom, and with helical trace line T passing through the leading and trailing edges of the section.

The blades of the three aircraft propellers are hollow and are constructed of any of various modern materials combining great strength and stiffness with light weight.

It is clear from the shapes of the blades of the aircraft propellers that centrifugal stresses and deflections present a major problem in the application of the induction propeller to aircraft, since each blade is an eccentric member which must hold its eccentric shape as it whirls. This is a considerably different problem from that of the conventional propeller in that the induction propeller must have stiffness and strength in bending, whereas the conventional propeller is loaded almost entirely in tension by centrifugal loads. Consequently the induction propeller employs a hollow-tube cantilever beam type of structure with the greatest emphasis on light weight in the eccentric tip portions, and with relatively large deep root sections. Hollow blade sections are essential because they provide the highest available values of section moduli per unit of cross sectional area of structural material.

In past years certain conventional propeller blades employed a small amount of forward rake for the purpose of introducing corrective stresses into the blade material when the propeller whirls. The amount of such rake was so small that drawings illustrating the effect were exaggerated to permit the change from the conventional blade shape to be perceived. This was an accidental approach to the induction propeller but was unlike the induction propeller in several essential features, as described below.

The aerodynamic pressure on a propeller blade which propels an aircraft also bends the blade forward slightly. The bending is slight because as soon as any deflection occurs very strong centrifugal forces act on the eccentric whirling mass of the blade and produce bending moments equal and opposite to the bending moments due to air pressure, and the forward bending deflection of the blade ceases.

The predominant stress in a conventional propeller blade is tension due to centrifugal forces, as compared to which the bending stresses due to propulsive pressures are very slight. This is illustrated by the helicopter which conventionally employs a free hinge without any bending restraint at the roots of its blades, and depends entirely on centrifugal forces to keep the blades from folding upwardly when bearing lift.

For carrying the tension loads in a conventional propeller blade a solid cross section is just as effective as is a hollow tube-like cross section. For the purpose of avoiding bending stresses, in the absence of any requirement to resist flattening out into a centrifugal flat plane, a thin solid blade is advantageous, being more flexible in bending in a comparable design. Its flexibility enables it to bend with less stress and its deflection brings corrective centrifugal bending stresses into play more readily, balancing out pressure bending moments, as described.

A flexible tension-type of blade of this sort is capable of adjusting itself to a variety of loadings, always with small bending stresses, because of its strap-like tension carrying character.

Into such a flexible conventional blade an initial forward rake was built, so that in straightening when whirling, in the absence of pressure loads, bending stresses would exist in the blade, and then, in addition, when the pressure loads existed, producing opposite bending stresses, the net bending stresses in the blade would be near zero, or could be made any desired small value for particular purposes.

This construction differs from the induction propeller in several essential respects: (a) In the conventional propeller the amount of the initial blade rake when not whirling was of the same order of magnitude as the ordinary fore-and-aft tip deflection it experienced. This amount of rake was so small as to produce an amount of induction benefit undetectable for all practical purposes.

(b) In the conventional propeller there was nothing to be gained from a stress reduction standpoint by designing the blade to retain forwardly raked form while whirling.

(c) The whirling of the conventional blade caused it largely to lose the small amount of rake which it had in the relaxed state, so that, in effect no induction effect existed where it mattered, in operation.

(d) The large amount of generatrix rake needed for the induction propeller far exceeds the amount which is favorable for stress reduction; no routine continuation increasing the degree of raking in conventional propellers could have led to the induction propeller because there would be no incentive to continue once the discontinuity appeared in which structural detriment displaced structural benefit.

(e) The induction propeller is basically a stiff beam pronouncedly distorted out of a centrifugal whirling plane and intended to hold its distortion while whirling, whereas the stress-raked propeller is basically a flexible tension strap; the basic concepts are opposite.

If, however, a conventional propeller had been constructed to have the relatively pronounced form of the blade and the blade sections of the induction propeller, and if its blades had been made hollow to remove all material which exerts centrifugal force to a greater degree than it contributes to structural beam stiffness, a completely unexpected result would have occurred, greater thrust at less power, together with the other benefits of the induction propeller.

Even hollow induction propellers for aircraft are flexible to some degree, but they are as stiff as they can be made, in order to preserve the induction form when whirling. Using materials available today or in prospect in the near future, induction propellers for aircraft would not be structurally feasible except with hollow blade sections.

Figure 1:
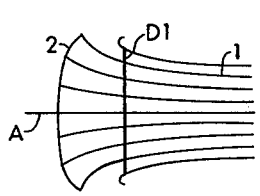
Figure 2:
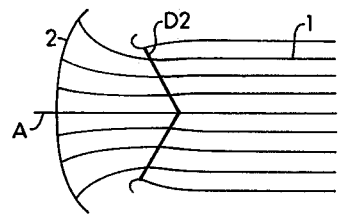
Figure 3:
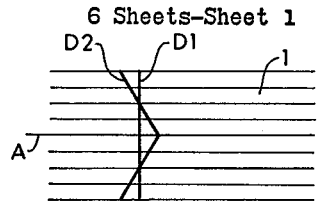
FIGURE 3 is a side view diagram similar to FIGURES 1 and 2 showing typical streamline patterns at very fast forward speeds, with the radial generatrices D1 and D2 of both propellers indicated on the same figure; the streamline patterns are essentially the same for both types of propellers at very high speeds.
Figure 4:
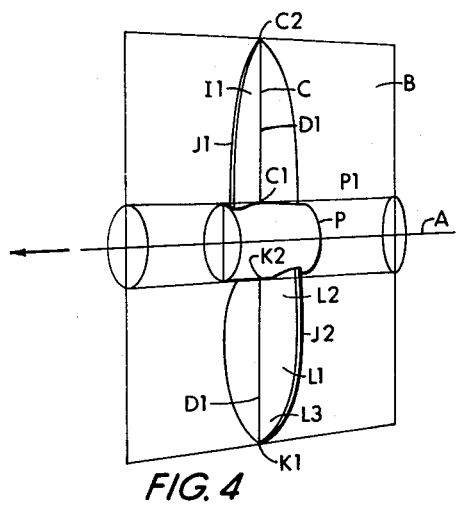
FIGURES 4 through 8 are diagrams illustrating most of the elements of geometric form A through S defined above.

The performance of the induction propeller has been confirmed experimentally. A small simple four blade high solidity air propeller with flat blades, turned by an electric motor at constant speed, was used to test static thrust and power input, varying blade angle and forward obliquity of the blade centerlines. Also slipstream patterns were observed. Results showed that the ratio of static thrust to power increased about 35 percent at 30° forward obliquity. This agrees well with expression (5) which was derived from purely theoretical considerations at a later date. At 40° forward obliquity the induction effect decreased, presumably due to increasing turbulence in the slipstream, which was believed to be caused at least in part by the crude blade form of the model propeller. The slipstream patterns confirmed the ability of the induction propeller to spread the slipstream. See FIGURES 1 and 2. It was also observed that slipstream rotation was reduced as the blades were raked forward, implying that a saving of energy and an increase of efficiency would be derived from this source also.

The experimental characteristics of a three blade sweptback marine induction propeller having a generatrix with 13° forward obliquity at the root and 25° forward obliquity at the tip, and otherwise of arbitrary design were determined in the David Taylor Model Basin, U.S. Navy. Comparison of the most significant performance parameters against the closest comparable data from the Troost series of propellers (reference: Transactions North East Coast Institution of Engineers and Shipbuilders, volume 67, 1952) representative of the best modern conventional propellers, showed these results: For three bladed propellers having the same pitch, diameter, and approximately the same blade area, turning at the same rotational speed, the induction propeller developed 12 percent greater static thrust and 20 percent greater static thrust per unit power than the best conventional practice.

I claim:

1. In a screw propeller, a blade of pronouncedly oblique helical form having substantially constant helical pitch, a root end on said blade, the radial generatrix of said blade having pronounced forward rake, said blade being sweptback markedly along its generating helix thereby situating the tip end of said blade on one position of the radial generatrix side-rearwardly along the helix from another position of the radial generatrix on said root of said blade, such that the forward rake of said generatrix is much greater than the forward rake of said blade.

2. In a screw propeller, a central hub, a helically pitched blade attached to said hub, said blade generated on a helix having forward sloping obliquity, said blade rotating around the axis of said hub, the space swept out by said blade in one rotation around said hub without axial translation having the form of a substantially flat disk standing perpendicular to the axis of said hub, said blade being markedly curved when viewed in a direction perpendicular to its whirling plane, the tip of said blade being situated markedly behind the root of said blade in rotation.

3. A screw propeller comprising a central hub, a blade attached to said hub, said blade being generated on a helix having pronounced forward-sloping obliquity, a tip end on said blade, said blade being markedly sweptback, the plane of rotation of a point on said tip end passing through said hub at the root of said blade.

4. A screw propeller comprising a central pivotal hub, a pitched blade attached to said hub, an outer region on said blade including all the area of said blade lying at a distance from the root of said blade toward the tip of said blade greater than half of the centerline length of said blade, said outer region having distinct forward-sloping obliquity in all cross sections taken in radial planes which include the axis of rotation, a tip on said blade, an airfoil section on said tip, a middle reference point at said tip airfoil section, said outer region of said blade being swept back such that the flat plane enclosed within the circle of one rotation without axial translation of said middle reference point at said tip airfoil section lies everywhere within the volume swept out in said one rotation of said blade and said hub.

5. A screw propeller comprising a central pivotal hub, a helically generated blade attached to said hub, the radial generatrix of said blade having pronounced forward rake, said blade having pronounced sweepback, said blade thereby having substantially less rake than said generatrix, said propeller thereby occupying space of substantially the same form as that occupied by a conventional propeller helically generated by a normal generatrix, and thereby being suitable for mechanical interchangeability with conventional normally generated helical propellers, as described.

6. On a screw propeller for propelling a vehicle forwardly through a fluid, a hub member, a blade member attached to said hub member, said blade member having an outer region extending over at least the outer half of the centerline length of said blade, said outer region having forward sloping obliquity in all cross sections taken in radial planes which include the axis of rotation, said blade member having a downstream surface on the face of the blade generally opposite from the direction of forward motion of said propeller, said propeller having a central axis of rotation, the tip of said blade being situated markedly behind the root of said blade in rotation, said blade member in one rotation around said axis without axial translation sweeping out a body of revolution having the form of a disk thickened toward the axis and convex on both faces, said blade member being so situated that an observer located in the plane of rotation of any point on said downstream surface in said outer region of said blade can see said point along a line of vision having a substantial angle relative to said downstream surface when said point is on a straight line between the observer's eye and the axis of rotation and cannot see the upstream surface of said blade directly opposite said point.

7. A screw propeller comprising a central hub, a blade attached to said hub, said blade being generated on a helix having pronounced forward-sloping obliquity, a leading edge, a trailing edge, and a tip end on said blade, said blade being sweptback, the plane of rotation of a point on said tip end passing through the entire length of said blade between the leading and trailing edges thereof.

8. In a screw propeller, a central hub, a blade member conforming at all points to the shape of a helix having substantially constant helical pitch, the radial generatrix of the helix having pronounced forward rake, said blade member being attached to said hub member, the space swept out by said blade in one rotation around said hub without axial translation having the form of a disk thickened toward the axis of rotation and convex on the front and rear faces, said blade being markedly curved when viewed in a direction perpendicular to its whirling plane, the tip of said blade being situated markedly behind the root of said blade in rotation.

9. In the propeller of claim 8, the radial generatrix having forward convexity.

10. In the propeller of claim 8, the radial generatrix having rearward convexity.

References Cited by the Examiner

UNITED STATES PATENTS

| | | | |
|---|---|---|---|
| D. 137,472 | 3/1944 | Birsh | 170—159.1 |
| 350,278 | 10/1886 | Wetherill | 170—159 |
| 1,023,584 | 4/1912 | Muhlberg | 170—159 |
| 1,365,808 | 1/1921 | Wood | 170—159 |
| 1,813,113 | 7/1931 | Buhren | 170—159 X |
| 2,335,394 | 11/1943 | Devore | 170—159 |
| 2,415,380 | 2/1947 | Weber | 170—159 |
| 2,451,106 | 10/1948 | Martin | 170—159 |
| 2,540,709 | 2/1951 | Burton | 170—159 X |
| 2,582,559 | 1/1952 | Pearson | 170—159 |

FOREIGN PATENTS

| | | |
|---|---|---|
| 12,689 | 1892 | Great Britain. |
| 29,159 | 10/1918 | Norway. |

MARK NEWMAN, *Primary Examiner.*

MILTON BUCHLER, JULIUS E. WEST, *Examiners.*